June 24, 1958

W. ROTH ET AL

2,839,915

METHOD AND APPARATUS FOR MEASURING
VISCOSITY, ETC., OF FLUID-LIKE
MATERIALS

Filed May 22, 1951

INVENTOR
STANLEY R. RICH
WILFRED ROTH
BY
Pennie, Edmonds, Morton, Barrows and Taylor
ATTORNEYS

June 24, 1958

W. ROTH ET AL
METHOD AND APPARATUS FOR MEASURING
VISCOSITY, ETC., OF FLUID-LIKE
MATERIALS 2,839,915

Filed May 22, 1951

INVENTOR
STANLEY R. RICH
WILFRED ROTH
BY
Pennie, Edmonds, Morton, Barrows and Taylor
ATTORNEYS

United States Patent Office 2,839,915
Patented June 24, 1958

2,839,915

METHOD AND APPARATUS FOR MEASURING VISCOSITY, ETC., OF FLUID-LIKE MATERIALS

Wilfred Roth and Stanley R. Rich, West Hartford, Conn., assignors to Bendix Aviation Corporation, New York, N. Y., a corporation of Delaware Application May 22, 1951, Serial No. 227,694

46 Claims. (Cl. 73—59)

This invention relates to determining physical properties of fluid-like materials, particularly liquid materials and thin films. The invention is especially important in the field of viscosimetry, and provides a method and apparatus for determining a function of the viscosity of liquid materials and thin films. However, it may also be used to determine other important properties thereof.

Viscosity is an important property of liquids. Broadly it may be defined as the resistance of a liquid to flow when force is exerted upon it, and is the opposite of fluidity. Quantitatively, viscosity may be defined as the tangential force per unit area of either of two parallel planes spaced a unit distance apart, required to move one plane at unit velocity while the other is fixed, the space between the two planes being filled with the liquid. Viscosity is denoted $\eta$ (eta) herein, and the c. g. s. unit is the "poise."

It is important to many industrial producers to know accurately the viscosity of their products. Examples are chemical, food, paper, plastics, paint, petroleum and rubber producers. Knowledge of the viscosity of the ultimate product may be important in order to meet material specifications. In other cases knowledge of the viscosity of intermediate products is important as a check on the manufacturing process itself. Knowledge of viscosity is likewise of importance in many experimental laboratories.

Many forms of viscosimeters have been developed. In one type the time of fall of a ball in a liquid is determined. In another, the torque reaction on a rotating shaft which spins a vane in the liquid is measured. In a third the viscous drag on a body suspended in a stream of liquid moving at a known velocity is measured. In a fourth the time of passage of a specific quantity of fluid through an orifice or small-bore tube is determined.

Most of the known devices and methods do not yield instantaneous and continuous information. Some involve moving parts, others require maintaining a fixed fluid flow, and still others require human manipulation to make a measurement. Most of them cannot be permanently mounted in a production kettle or pipe line, and many cannot be operated at high pressures and temperatures.

It is an object of the present invention to provide a method and apparatus for determining a function of the viscosity of a liquid material which is free of most or all of the foregoing defects. The apparatus of the present invention is capable of measuring continuously and automatically the viscosity of liquids and semi-liquids, while the liquid is either at rest or in motion. No moving parts are required in the sensing device or probe contacted by the liquid, and explosion-proof hermetic units are readily designed. The apparatus can be constructed to withstand high temperatures and pressures, as well as low temperatures and vacuums. If desired, the output of the instrument can be used to operate a standard industrial recorder. Inasmuch as the viscosimeter supplies instantaneous and continuous information, it can be used in an automatic control system so as to control the viscosity of products in continuous production.

Broadly speaking, the present invention makes use of elastic waves in solids in a novel manner to achieve these objectives. To this end, elastic waves are excited in an elongated body of solid material, at least a portion of which is adapted to be contacted by the liquid whose viscosity is to be measured. The mode of oscillation of the elastic wave in the solid is selected so that there is a component of oscillation of the elongated body in shear with the contacting liquid. In most cases at least a portion of the elongated solid will be immersed in the liquid, although it is possible in many cases to determine viscosity when only a relatively thin film of the liquid is in contact with the solid. The presence of the liquid in contact with the solid damps the elastic wave oscillations in the latter, and the degree of attenuation of the oscillations is directly related to the viscosity of the liquid. A measuring device is provided which is responsive to variations in attenuation of the oscillations in the elongated body, and hence gives an indication of variation in viscosity of the liquid. The contacting liquid also changes the velocity of propagation of the oscillations in the elongated body, and this change can be measured in lieu of attenuation if desired, although the latter is preferred. In some cases both effects can be measured to advantage.

It can be shown that with oscillations which produce shear between the solid and the liquid, the attenuation in the solid is directly related to the viscosity. It is also a function of the density of the liquid, but the density is usually constant or nearly so, and in any event can be readily ascertained and a suitable correction applied. For most normal, relatively fluid liquids, the attenuation is determined by these two factors, together with other factors which are readily maintained constant, so that the response is an accurate indication of the viscosity. Some liquid materials, particularly high polymers, have sufficient shear elasticity to affect attenuation also. Such liquids are often called complex or non-Newtonian. Where necessary, it is possible to separate shear elasticity from viscosity and hence obtain a reading which is a function of viscosity alone, but in most practical applications this is unnecessary.

It is found that modes of oscillation which produce compression of the liquid at the liquid-solid interface are undesirable in most instances, inasmuch as compressional modes are readily propagated in liquids and the damping effect on the oscillations in the solid is not sufficiently directly related to the viscosity of the liquid but involves many other factors which obscure the effect of viscosity. On the other hand, modes which produce shear at the interface result in tangential movement between solid and liquid so that the damping effect of the liquid is directly related to the viscosity thereof. For most liquids the shear mode does not propagate very far from the point of excitation. For liquids having considerable shear elasticity, some propagation of shear modes takes place and introduces radiation losses in addition to those due to viscous damping. In many cases, particularly in commercial applications, this is a valuable characteristic of the invention inasmuch as the combined effect of viscosity and shear elasticity may be the quantity sought to be measured. Where necessary or desirable, however, the effect of shear elasticity can be separated from that of viscosity. Actually, even the approximate determination of viscosity of very highly viscous or semi-solid liquids, for example putty, has heretofore been very difficult or impossible. Hence the present invention provides means for determining viscosity at least approximately in an entirely new range of materials.

There are several modes of oscillation which can be excited in elongated bodies to produce a component of oscillation in shear with a contacting liquid. It is preferred to employ the longitudinal compressional mode propagating lengthwise of the solid, and oscillating in the same direction. Such a mode of oscillation will also produce a certain amount of compressional radiation between the solid and the liquid due to expansion and contraction of the solid as the wave propagates therealong. In the case of liquids of low and moderate viscosity, the compressional radiation may seriously affect the accuracy of measurement and suitable means are described hereinafter for reducing the compressional radiation to a negligible degree.

Another possible mode of oscillation in the solid is the so-called shear mode which propagates longitudinally of the elongated solid with the direction of oscillation in the lateral direction. This mode of oscillation also radiates compressional energy and suitable means for minimizing this radiation are described hereinafter. A third mode of oscillation is the torsional mode in which the direction of propagation is lengthwise but the direction of oscillation is around the solid.

It is particularly contemplated and preferred to pulse excite the elongated body, allowing sufficient time between pulses for the oscillations to die away. The rate of decay of the oscillations is directly related to the viscosity, and convenient and relatively simple circuits suffice to determine the rate of decay. For some applications, however, continuous excitation may be employed.

It is also particularly contemplated and preferred to employ resonant lengths of the elongated solid, in which resonant oscillations can readily be established by pulse excitation. Where desired, however, it is possible to make the elongated body very long compared to the wave length of the oscillations therein, thus forming a non-resonant element.

Any suitable electrical measuring device can be employed to indicate variations in attenuation of the oscillations in the elongated body. Two forms of instrumentation are described in the specific embodiments. In one, the attenuated waves resulting from pulsed oscillation in a resonant element are, in effect, integrated, and the integrated value is measured by a suitable indicating circuit. Inasmuch as the attenuation will vary with the viscosity of the contacting liquid, the indicating circuit will yield a function of the viscosity.

Another form of circuitry which is at present preferred utilizes a source of pulses whose repetition rate can be varied. The attenuated oscillations set up in the resonant element are again integrated, and the integrated result used to control the pulse repetition rate so as to maintain the integrated result substantially constant. As will be shown, in this type of instrumentation the pulse repetition rate is directly proportional to the damping coefficient of the attenuated wave, and hence is directly related to the viscosity of the liquid.

For general use, the instrument can be calibrated in units involving both viscosity and density, or in arbitrary units. Such units suffice for most applications, since ordinarily only comparative measurements are required, but where necessary suitable factors can be applied to the readings to convert them to viscosity. For a given application, the instrument can be calibrated to read viscosity directly.

It will be understood that the invention is not confined to the measurement of viscosity of simple or Newtonian liquids. It is also useful in measuring physical properties of complex or non-Newtonian liquids, including viscosity, shear elasticity, etc. thereof. These physical properties are also present in liquid materials such as slurries, colloids, suspensions, fluidized solids (solid particles in gas media), etc., and the invention can readily be used therewith.

In the plastic industry the instrument is helpful in determining the thermosetting properties of resins. A thin coating of the resin may be applied to the probe and measurements taken as heat is applied. As the resin polymerizes, it becomes more and more viscous and the indicating instrument reads higher and higher, the increased attenuation being due to both increased viscosity and increased shear rigidity. Ultimately, when the resin sets, the reading decreases since only a thin film is usually used. The readings are valuable in controlling the composition of the resin, and for this purpose it is frequently unnecessary to determine just what physical properties the instrument is measuring, although it is possible to do so. In this manner it is possible to determine when the resin begins to set, as well as physical properties before and after setting.

The instrument is also useful in determining adhesive properties of thin films such as paints, glues, etc.

In general, the apparatus of the invention is useful to measure the damping characteristics of any non-rigid material which can be brought into intimate contact with the sensing element or probe, and the adhesive characteristics of materials in contact with the probe. The term "fluid-like material" will be understood to include such materials in addition to those mentioned hereinbefore.

The invention may be more fully understood by reference to the following description of specific embodiments thereof, taken in conjunction with the drawings in which:

Figs. 9a and 9b illustrate attenuated or damped oscillations, Fig. 9b being more highly damped than 9a;

Figure 1:
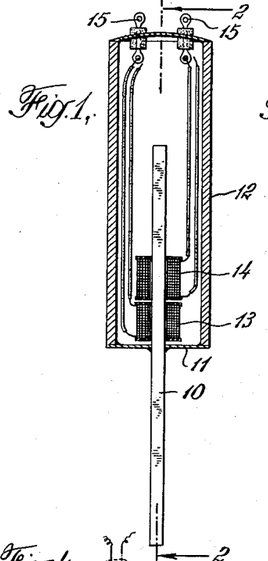
Fig. 1 is a longitudinal cross-section of a preferred embodiment of the sensing device, taken along the line 1—1 of Fig. 3.
Figure 2:
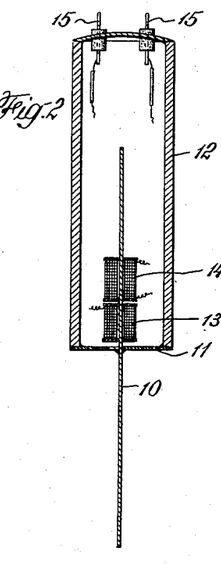
Fig. 2 is a longitudinal cross-section taken along the line 2—2 of Fig. 1.
Figure 3:
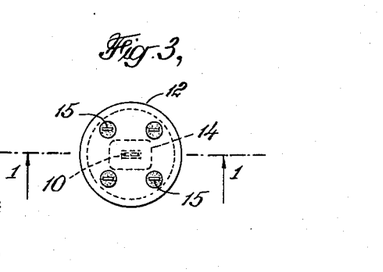
Fig. 3 is a top view of the device.

Referring now to Figs. 1–3, a sensing device is shown of the resonant element type particularly adapted for pulsed operation with the longitudinal compressional mode of oscillation. An elongated strip 10 of magnetostrictive material, such as nickel, is secured at its center to wall 11 affixed at one end of a cylindrical container 12. End wall 11 and container 12 may be made of any desired material, depending upon the application, and are here shown as a metal such as stainless steel. The choice of material depends upon the types of liquid with which it may be brought in contact, the required structural rigidity, and the temperatures and pressures which may be encountered.

Transducer means are provided in the form of two coils 13 and 14 encircling elongated strip 10 within the housing 12, but spaced slightly therefrom in order not to damp oscillations in the strip. As here shown, coil 13 is the transmitter coil and coil 14 is the receiver coil of the transducer. Suitable terminals 15 are provided for the ends of each coil. Although two coils are here shown, it is possible in many cases to employ only one coil and use it for both transmitting and receiving.

Figure 6:
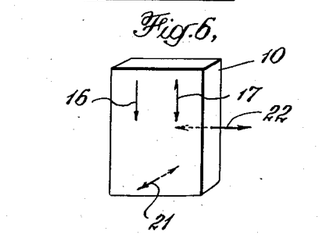
Figs. 6, 7 and 8 are drawings explanatory of longitudinal, torsional and shear modes of oscillation, respectively.

When a pulse of current is applied to transmitter coil 13, longitudinal compressional elastic waves are excited in elongated strip 10 by magnetostrictive action. Fig. 6 shows a short section of strip 10 and the direction of propagation of the waves longitudinally of the strip is indicated by the arrow 16. The direction of oscillation of the waves in the strip is also in the longitudinal direction as shown by the double arrow 17.

The length of strip 10 is selected so that resonant oscillations at a desired frequency are produced therein by a pulse applied to coil 13. In the specific illustration, the length of strip 10 is one-half the wavelength of the resonant oscillations. The physical length for a given frequency will of course depend on the material of which the strip is made, since the relationship between frequency and wave length is determined by the velocity of propagation which varies with different materials.

It is advantageous to support the strip at a nodal plane of all odd harmonics of the fundamental resonant oscillations. Since this is an antinodal plane for all even harmonics, these are rapidly damped out, thus facilitating subsequent electrical filtering. In the specific embodiment here shown, the half-wave strip is supported at its midpoint so as to eliminate all even-order harmonics, and so as to couple a negligible amount of fundamental energy into the housing.

Figure 4:
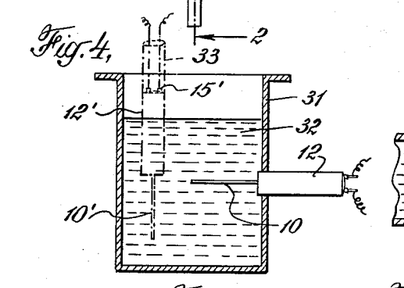
Fig. 4 shows the sensing device in position to determine the viscosity of a liquid in a vat, an alternative position being shown in dot-dash lines.

Figs. 4 and 5 illustrate several ways in which the sensing device of Fig. 1 can be used in measuring viscosity. In Fig. 4 a vat or kettle 31 contains a quantity of liquid 32 whose viscosity is to be measured. The housing 12 of the sensing device or probe is mounted in one wall of vat 31, with the exposed portion of strip 10 immersed in the liquid. This can be a permanent installation or provision may be made for inserting and removing the probe. The dot-dash position shown at 12′ is an alternative way in which the probe can be inserted in the liquid. Suitable provision can be made to support the device in the vat or it may be held therein by hand. In this case it is desirable to provide a shield 33 around the leads which is sealed to housing 12′ so that there is no danger of liquid coming in contact with the terminals 15′. Since housing 12 can be made explosion-proof and airtight, there is no danger of causing explosions or fires due to the use of the device.

Figure 5:
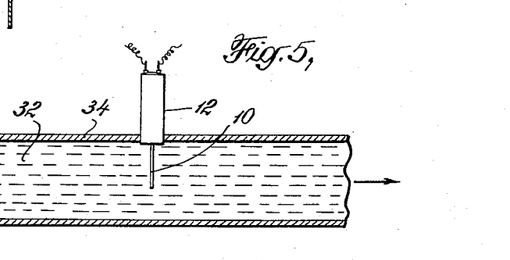
Fig. 5 shows the sensing device in position to measure the viscosity of a liquid flowing in a conduit.

Fig. 5 shows the device mounted in the wall 34 of a conduit through which liquid 32 passes continuously. Inasmuch as the viscosity readings are practically instantaneous, an arcuate check on the viscosity can be obtained. If desired, the viscosity readings can be employed to control automatically the amounts of materials used in making the liquid, or to control other processing steps, so as to maintain the viscosity within predetermined limits.

Figure 9A:
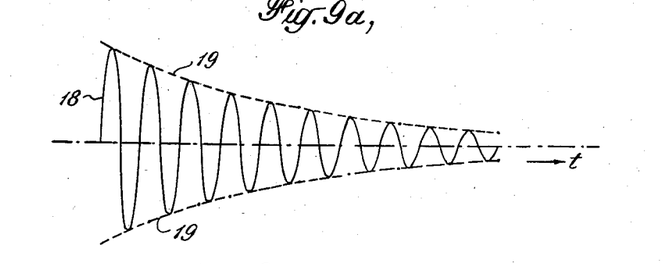
Figure 9B:
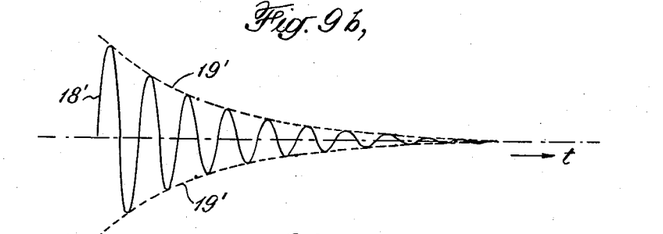

With the sensing device or probe of Fig. 1 disposed in air or a vacuum, oscillations produced in strip 10 by a pulse will gradually die away due to the inherent damping of the device. However, the attenuation of the oscillations will be relatively small, and hence the period of decay will be relatively long. This condition is illustrated in Fig. 9a. The alternating wave 18 represents the resonant oscillations and they gradually decay with time. The envelope of the wave has an exponential decay characteristic as indicated by dash lines 19. The shape of line 19 is usually denoted:

$$e^{-\alpha t} \qquad (1)$$

where
- $e$ = base of the Naperian logarithms
- $\alpha$ = damping coefficient
- $t$ = time Now, if the exposed end of strip 10 outside the casing 12 is immersed in a liquid, the liquid damps the oscillations so that they decay faster. This condition is illustrated in Fig. 9b and it will be noted that the envelope 19′ decays more rapidly. In the equation given above, the damping coefficient is greater for the wave of 9b than for 9a. By measuring the attenuation of the wave in the solid, particularly the damping coefficient $\alpha$, a measure of the viscosity can be obtained. Suitable instrumentation will be described later.

In many cases it is only necessary to have a thin film of the liquid on the surface of the strip 10 in order to get a good reading of viscosity. The thin film can be applied in any desired manner and this feature is particularly valuable when only small quantities of a liquid are obtainable. Even when large quantities of liquid are available, a permanent installation may be undesirable or impossible. Merely dipping the probe into the liquid and taking a reading after it has been withdrawn suffices.

The film thickness required for a given accuracy of measurement can be determined analytically. For simple liquids having negligible shear elasticity, the attenuation of shear waves in the liquid can be expressed in the form of the following damping factor:

$$e^{-\left(\frac{\omega \rho}{2\eta}\right)^{1/2} y}$$

where
- $\omega$ = angular velocity of the wave
- $\rho$ = density of the liquid
- $\eta$ = viscosity of the liquid
- $y$ = direction of propagation For liquids such as lubricating oil the amplitude falls to 37% in only a few thousandths of a centimeter. Similar equations can be derived to take into account shear elasticity, and in general thicker films are required for a given accuracy.

It is highly advantageous that the damping be produced by shear action between strip 10 and the liquid, and that radiation of compressional mode energy into the liquid be minimized, inasmuch as the shear damping is directly related to viscosity whereas compressional mode radiation is not. Referring again to Fig. 6, the direction of oscillation of the longitudinal elastic waves in the strip 10 is shown by the double-ended arrow 17. It is clear that the direction of oscillation of all four sides of the strip produces shear of the liquid. However, the oscillation longitudinally of the strip is accompanied by a dilation and contraction of the strip as the wave propagates therealong. This dilation and contraction is in a direction normal to the sides of the strip, as indicated by arrows 21 and 22, so that compressional mode energy is radiated into the liquid.

In order to reduce this compressional mode radiation to a degree which will not substantially affect the accuracy of the instrument, strip 10 is made thin compared to the width thereof. The dilation and contraction is proportional to the thickness of the material. Hence the dilation normal to the faces of the strip, indicated by arrow 21, is small compared to the dilation of the edges of the strip, indicated by arrow 22. Thus, although the faces of the strip have a relatively large area, the small dilation normal thereto reduces the compressional mode radiation from the faces to a small or negligible amount. On the other hand, although the dilation normal to the edges is much larger, the radiating surfaces are small in area so that the amount of compressional mode energy radiated from the edges is also reduced to a small or negligible amount. There is of course radiation from the end of strip 10, but the end area is sufficiently small so that this radiation is negligible.

The overall effect is that damping of strip 10 through contact with the liquid is predominantly due to shear between the solid and the liquid.

The dimensions of strip 10 will vary widely depending on the particular application. In one instrument which has been operated with success, a strip approximately 10 centimeters long, 3 millimeters wide and 0.2 millimeter thick is employed.

The relationship between viscosity and the damping of oscillations in strip 10 of the probe can be developed theoretically, and for a given instrument is subject to calculation. In particular, the envelope of the damped oscillation is an analytic function of viscosity. The following theory is given to explain the relationship. Certain simplifying assumptions and approximations have been made which are justified in the majority of cases. Therefore, although the analysis given is believed correct, it is not insisted upon and is subject to further elaboration. Tests support the overall soundness of the analysis.

For liquids where shear elasticity is negligible, it can be shown that the attenuation or damping factor for elastic waves in a thin metal strip such as strip 10 immersed in the liquid over its entire length is approximately:

$$e^{-\alpha t} \tag{1}$$

where $$\alpha = \frac{1}{\rho_m d}\left(\frac{\rho \omega \eta}{2}\right)^{1/2} \tag{2}$$

$\rho_m$ = the density of the metal strip
$d$ = the thickness of the strip
$\rho$ = density of the liquid
$\eta$ = viscosity of the liquid
$\omega$ = angular velocity of the resonant frequency Inasmuch as $\rho_m$, $d$ and $\omega$ are constants for a given instrument, $$\alpha = K\sqrt{\rho \eta} \tag{3}$$

K is a constant which takes into account the fixed factors.

It will be noted that this is a very desirable relationship in that the damping is a direct and analytic function of viscosity (varying directly with the square root thereof) and the density of the liquid is the only other variable. The density of a given liquid will ordinarily be constant for most measurements, or nearly so, and hence the damping is directly proportional to the square root of the viscosity.

For complex liquids such as high polymers, colloids, suspensions, gels, etc., the shear elasticity $g$ may become appreciable. In this case a more rigorous analysis may be employed to include the effect of viscosity and shear elasticity on damping, and also on resonant frequency, as indicated by the following complex expression:

$$e^{-kt} = e^{-\alpha t} e^{-j\beta t} \tag{4}$$

where:

$$k = \alpha + j\beta \tag{5}$$

$$\alpha = \frac{[\rho^2 g^2(1+Q^2)]^{1/4}}{\rho_m d} \cos\left(\frac{\tan^{-1} Q}{2}\right) \tag{6}$$

$$\beta = \alpha \tan\left(\frac{\tan^{-1} Q}{2}\right) \tag{7}$$

$$Q = \frac{\omega \eta}{g} \tag{8}$$

These equations show that for complex liquids where shear elasticity is not negligible, both attenuation and frequency variations of the oscillations in strip 10 are obtained. The expression $e^{-\alpha t}$ in Equation 4 is the true damping factor and the expression $e^{-j\beta t}$ gives the change in frequency. If the attenuation only is measured, a reading is obtained which is a function of both viscosity and shear elasticity (see Equation 6). This indication will suffice for most practical purposes. However, in those cases where it is desired to separate viscosity and shear elasticity, it is possible to measure the change in frequency of the resonant strip 10 when the strip is inserted in the liquid. Then, by using Equations 6 and 7, the viscosity and shear elasticity can be separated.

In the previous discussion of liquids having negligible shear elasticity, the effect of the liquid on attenuation was developed with the aid of Equations 1-3, and it is preferred to utilize variations in attenuation in determining the viscosity and other physical properties of the liquid. With liquids having appreciable shear elasticity, the measurement of attenuation may be supplemented by measurement of change of frequency as just pointed out. However, the above Equations 4-8 for the more general case show that measurement of change of frequency can be used in lieu of change of attenuation if desired. Thus from Equations 7 and 8, $\beta$ is seen to depend on $\eta$ as well as $g$, and can be employed to indicate a function of viscosity. With purely viscous liquids where $g$ approaches zero, Equation 7 reduces to $\beta = \alpha$. Thus with such liquids a frequency shift is observable when attenuation is present.

The frequency shift arises from the physical fact that the actual velocity of propagation of the elastic wave in the resonant strip 10 decreases as the viscous damping increases. This effect produces a decrease in the resonant frequency of the strip. Thus determining the change in frequency is a measurement of change in velocity of propagation which in turn is related to viscosity. However, the percent change in frequency is very small compared to that in attenuation, and requires much greater stability and sensitivity of the measuring circuits.

The instrumentation described hereinafter measures the attenuation of the decaying oscillation and permits $\alpha$ to be determined. Rearranging Equation 2 and assuming that only the exposed half of the resonant strip 10 of Fig. 1 is immersed in the liquid, the following equation is obtained:

$$\eta = \frac{8(\alpha \rho_m d)^2}{\rho \omega} \text{ poises} \tag{9}$$

$$\eta = k'\frac{\alpha^2}{\rho} \text{ poises} \tag{10}$$

This is for the case where shear elasticity is negligible and is the case most commonly met with in practice. The viscosity varies directly as the square of the attenuation or damping coefficient $\alpha$. Where viscosity in poises is desired, it can be obtained by determining the constant $k'$ for the particular instrument employed, and dividing by the density $\rho$.

Similar expressions can be derived from Equation 6 for the case where shear elasticity is not negligible, but will of course be more complicated. In this event $\eta$ in the above Equation 9 may be replaced by the following expression:

$$\eta\left(1+\frac{1}{Q^2}\right)^{1/2} 2\cos^2\left(\frac{\tan^{-1} Q}{2}\right) \tag{11}$$

It might be mentioned that when considerable shear elasticity is present, it is desirable to take readings with the probe immersed in a fairly large volume of liquid to obtain accuracy. However, for comparative purposes small quantities or thin films often suffice.

Figure 10:
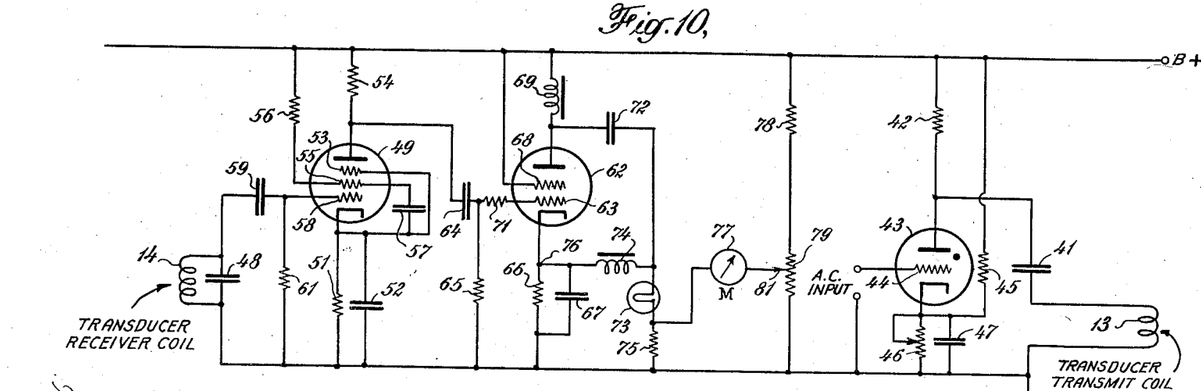
Fig. 10 shows one form of instrumentation for indicating changes in viscosity using a fixed pulse repetition frequency.

Referring now to Fig. 10, a form of instrumentation is shown using a fixed pulse repetition frequency. Each pulse excites a train of resonant oscillations in the elongated strip 10 (Fig. 1) which gradually decay as illustrated in Figs. 9a and 9b. Advantageously the pulse repetition frequency is selected so that the oscillation decays to a negligible value between successive pulses over the range of operation for which the instrument is designed, although this is not essential in all cases. In a particular embodiment which has been operated with success, the pulse repetition frequency is 60 per second and the frequency of oscillations as determined by strip 10 is of the order of 25 kilocycles per second. It will be understood that Figs. 9a and 9b are only schematic, since a very large number of oscillations will occur in the decaying waveform. Advantageously the pulse length is selected so that its duration is less than a half period of the resonant oscillation, so as not to interfere with the rapid buildup of oscillations in the strip. Pulses of the order of 1 microsecond have been employed with success. Electrical waves corresponding to the elastic waves in strip 10 are produced in the transducer means (receiver coil 14 in Fig. 1) and have the wave shape shown in Fig. 9. The received waves are applied to a receiver circuit designed to respond to variations in the attenuation of the wave. In the specific embodiment of Fig. 10, this is accomplished broadly by integrating the received wave and measuring the resultant value.

The pulse transmitter is shown at the right of Fig. 10. A capacitor 41 is placed in series with the transducer transmit coil 13 and is charged from a suitable voltage source denoted B+ through resistor 42. A grid-controlled gas discharge tube 43 is shunted across the capacitor and transmit coil circuit so as to periodically discharge the capacitor through the coil and pass a pulse of current therethrough. The gas discharge tube 43 is periodically caused to conduct by any suitable means. Conveniently, a small 60-cycle A.-C. voltage is derived from the power mains through a transformer and is applied to grid 44 of the tube. Cathode bias is obtained from the B+ source through the voltage divider resistors 45 and 46. The latter is variable so that a suitable operating cathode bias can be selected. A large by-pass capacitor 47 is provided across resistor 46 to insure constancy of cathode bias.

When tube 43 fires, a very short pulse of discharge current passes through the transducer transmit coil 13. The duration may be of the order of 1 microsecond or more, and amplitudes of 1 ampere or more may be readily obtained.

The transducer receiving coil 14 is tuned by capacitor 48 to the resonant frequency of the ringing oscillations in the elongated strip 10. As explained before, by mounting strip 10 at its midpoint the second harmonic is eliminated along with higher even-order harmonics. The simple tuned circuit shown suffices to eliminate the third harmonic and higher odd-order harmonics. Thus only the fundamental resonant frequency is effective in the measuring circuit.

The received oscillations are then applied to an amplifier tube 49, here shown as a high gain pentode. Cathode bias is provided by the cathode resistor 51 and shunting capacitor 52, and the suppressor grid 53 is connected to the cathode. Anode voltage is obtained from the B+ source through the load resistor 54. Operating potential for the screen grid 55 is obtained from the B+ source through resistor 56 and shunting capacitor 57. The signal is applied to the control grid 58 through coupling capacitor 59 and grid resistor 61.

This amplifier stage is designed to amplify with reasonable linearity the entire received damped oscillation. The output signal is fed to a second amplifier stage including the electronic tube 62, here shown as a beam power tetrode capable of delivering sizable amounts of power. The output of tube 49 is fed to the control grid 63 through coupling capacitor 64 and grid resistor 65. A limiting series resistor 71 is inserted in the grid circuit for purposes to be described later. Cathode bias is provided by the cathode resistor 66 and shunting by-pass capacitor 67. The screen grid 68 is connected directly to the B+ source and the anode is connected to B+ through the choke 69.

The A.-C. output of amplifier 62 is shunt fed through capacitor 72 to a non-linear resistance 73 forming the plate load. The non-linear resistance is here shown as a small tungsten filament lamp, but other forms of non-linear resistances may be employed if desired.

When the elongated strip 10 (Fig. 1) is not immersed in a liquid, the oscillations are relatively undamped, and the received oscillation decays relatively slowly as indicated in Fig. 9a. Under these conditions the greatest amount of energy is fed to lamp 73. Since the resistance of the lamp 73 increases with temperature, the highest resistance will be obtained when strip 10 is in air.

On the other hand, when the strip 10 is immersed in a liquid, the oscillation decays more rapidly as shown in Fig. 9b, due to the viscosity of the liquid. Consequently the energy fed to lamp 73 is less, and its resistance is lower. Therefore, the resistance of the lamp is an inverse function of the viscosity of the liquid.

In the first instance the resistance of lamp 73 is an inverse function of the damping coefficient $\alpha$, assuming the first cycle of the decaying oscillation to be of constant amplitude as is substantially true for most applications. This follows from the fact that $\alpha$ determines the rate of decay and hence the area of each damped train. With a fixed number of damped trains per second, $\alpha$ determines the total area per second and hence the energy per second supplied to the lamp. In a given case, the variation in resistance with $\alpha$ can be computed, if desired. Since $\alpha$ is a function of viscosity, the resistance of lamp 73 is likewise a function of viscosity.

The change in resistance of lamp 73 is indicated by passing a D.-C. current therethrough and measuring a voltage proportional to the current. To accomplish this, lamp 73 is included in a D.-C. circuit comprising the series choke 74 and a small measuring resistor 75. Inasmuch as the D.-C. potential of the cathode of tube 62 is fixed, it is a convenient source. This potential is applied to the series circuit.

A voltmeter 77 is connected between the upper terminal of resistor 75 and a zero-setting circuit comprising resistor 78 and potentiometer 79. With the strip 10 in air, and maximum resistance of lamp 73, a minimum D.-C. current flows through the lamp and its series measuring resistor 75. The contact 81 on the potentiometer is set so that the meter reads zero under these conditions. Then, when elongated strip 10 is inserted in a liquid, the decreased resistance of lamp 73 allows more D.-C. current to flow through measuring resistor 75, and the meter 77 gives an increased reading. The higher the viscosity of the liquid, the lower the resistance of lamp 73 and the higher the meter reading.

As stated above, the resistance of lamp 73 is an inverse function of the viscosity of the liquid being measured. By making the resistance of choke 74 and measuring resistor 75 small compared to that of the lamp 73, the meter reading is inversely proportional to the resistance of lamp 73. Consequently, the meter reading is a direct function of the viscosity. The exact function can be determined from the characteristics of the non-linear resistance and other parameters of the instrument. Of course, if the resistance of 74 and 75 is appreciable, it can be taken into account in calibrating meter 77.

For a liquid of known density, meter 77 can be calibrated against known viscosity standards and will then read viscosity directly. The meter reading is single valued and reproducible, and the apparatus will hold its calibration accurately a long period of time. Where the instrument is to be used with liquids of different density, meter 77 can be calibrated to read viscosity times density, or in arbitrary units. For any given liquid density, the readings can then be modified by the proper factor to give the viscosity. For a great many industrial purposes, where it is only necessary to maintain a given liquid at a given viscosity, or where comparative values only are sought, arbitrary readings suffice. For example, the reading for a liquid of acceptable characteristics may be determined, and that reading used in testing others. Calibration in terms of viscosity times density is analogous to calibration in terms of stokes (viscosity divided by density), which is a unit long used in viscosimetry.

It will be apparent that since the transmit coil 13 is closely adjacent to receive coil 14 (Fig. 1), the very large transmitted pulse will induce a rather large pulse in the receive coil. The magnitude of this pulse in the receive coil may be many times the initial amplitude of the received oscillatory wave as shown in Fig. 9. While it is possible to eliminate the effect of this initial pulse on the receiver circuit by gating the receiver amplifier or by other means, it has been found satisfactory to design the amplifier stages including tubes 49 and 62 so that they will limit the initially induced pulse to a value which does not greatly exceed the initial value of the resonant oscillation. Some limiting takes place in tube 49 due to the tube being driven beyond cutoff. The time constant of the capacitor 59 and resistor 61 is advantageously low enough so that there is no danger of blocking if the grid is driven momentarily positive. The resistor 71 in series with the grid of tube 62 limits the signal in the positive direction so that it does not substantially exceed the initial portion of the resonant oscillation. These simple expedients have proved to be satisfactory in practice, but more elaborate means may be employed if desired.

The use of separate transmit and receiver coils as shown in Fig. 1 is sometimes helpful, for example, where it is desired to use more turns on the receiver coil to increase sensitivity. However, a single coil can be used for both purposes ordinarily with resultant simplification of the sensing device.

Figure 11:
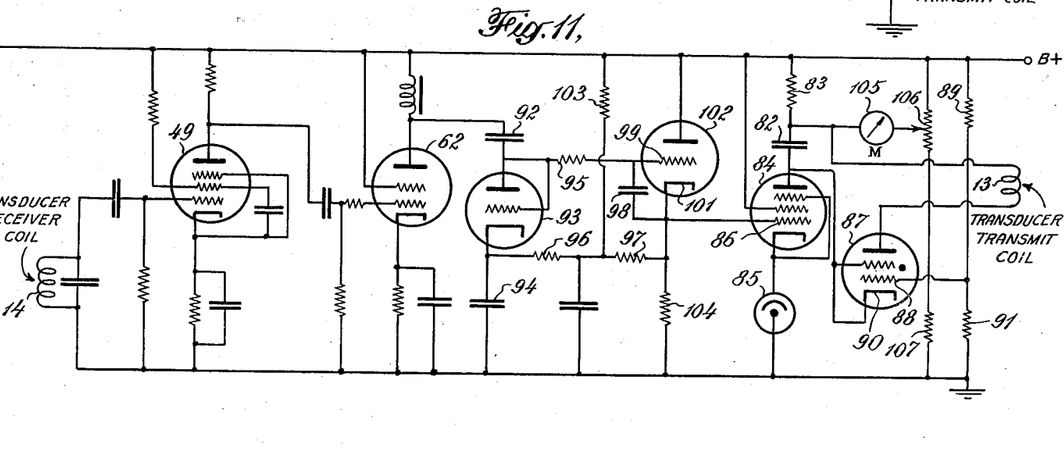
Fig. 11 shows another form of instrumentation using a variable pulse repetition frequency.

Referring now to Fig. 11, a form of instrumentation is shown in which the pulse repetition rate is varied in such a manner as to maintain constant the average value of the exponentially decaying oscillation envelopes. In this version the pulse repetition frequency is made almost exactly proportional to the exponential damping coefficient $\alpha$. It has been shown previously that viscosity of the fluid is proportional to the square of $\alpha$ for simple liquids. Therefore a simple measurement of the pulse repetition frequency serves to indicate viscosity.

The areas under an exponential wave such as shown at 19 in Fig. 9 (the rectified and detected A.-C. wave) is equal to:

$$\int_0^\infty E_o e^{-\alpha t} dt = -\frac{E_o}{\alpha} e^{-\alpha t} \Big]_0^\infty = \frac{E_o}{\alpha} \quad (12)$$

where
$E_o$ = initial magnitude of the envelope of the received signal.

This assumes that $t$ approaches infinity, which is the case where the exponential envelope is allowed to decay to a negligible value before the next pulse is transmitted.

In a given period of time, say 1 second, there are $f$ pulses and $f$ exponential envelopes. Thus the area under the envelopes, integrated over a 1-second period of time, is $$\frac{f \times E_o}{\alpha}$$

As will be explained, the circuit of Fig. 11 causes the integrated area to always equal a constant value C for all conditions. Hence:

$$C = \frac{fE_o}{\alpha}$$

Rearranging:

$$\alpha = \frac{fE_o}{C}$$

$E_o$ and C are constants of the system, or nearly so. Hence $f$ is substantially linear with $\alpha$. This is a very useful result and is achieved in the system of Fig. 11 to a high order of precision.

The variable frequency pulse generator is shown at the right of Fig. 11. A capacitor 82 is inserted in a charging circuit which includes B+, a series resistor 83 and a controllable variable resistor which here takes the form of a pentode 84. The cathode is maintained at a constant D.-C. value by the voltage regulator tube 85. The screen grid is connected to B+ and the suppressor grid is connected to the cathode. The effective anode-cathode resistance of tube 84 is controlled by its grid-cathode potential and other inherent characteristics. Thus by varying the potential applied to grid 86, the rate of charging of capacitor 82 can be controlled.

A discharge circuit for capacitor 82 is provided including the transmit coil 13 of the transducer and a grid-controlled gas discharge tube 87, here shown as of the tetrode type. The control grid 88 of the discharge tube is maintained at a selected positive potential by a voltage divider consisting of resistors 89 and 91 from B+ to ground.

Immediately after a discharge of capacitor 82, the potential of cathode 90 of the discharge tube will be highly positive and the tube will be cut off. As capacitor 82 charges, the potential of cathode 90 will gradually fall. When it reaches a value nearly equal to the grid potential, the tube will fire and a short pulse of current will pass through the series transmit coil 13. This circuit arrangement assures that the charge across the capacitor will always reach a predetermined fixed potential before it is discharged. Consequently current pulses of uniform amplitude and duration will pass through transmit coil 13 regardless of the pulse repetition rate. The latter is determined by the rate of charging capacitor 82, and the charging rate is in turn controlled by tube 84.

With the circuit shown, the pulse repetition frequency may be varied over a wide range with excellent stability. In a circuit which has been used in practice, in which tube 84 is a 6AG7 and tube 87 is a 2050, a frequency variation of several thousand pulses per second down to zero is attainable with a 5-volt change in the grid-cathode potential of tube 84. By using other tubes and selecting suitable circuit constants any desired range of frequency variation can be obtained.

Received oscillations from coil 14 are applied to an amplifier including tubes 49 and 62 and associated circuits which are similar to those shown in Fig. 10 and need not be described again. In Fig. 11 the amplified signal is applied to an averaging detector to develop an integrated control wave proportional to the average value of the rectified damped oscillations. To this end, the output of tube 62 is supplied through a coupling capacitor 92 to a rectifier 93, here shown as a triode with its plate and grid connected together to form a diode. The R.-F. circuit of rectifier 93 is completed to ground through capacitor 94. Rectifier 93 acts as a clipper, shunting out the positive half cycles of the signals under the exponential envelopes of Fig. 9, leaving only the negative half cycles. These negative half cycles are integrated by a simple R-C network comprising resistors 95, 96, 97 and capacitor 98. The integrated control wave is applied between grid 99 and cathode 101 of tube 102.

As described thus far, the signal applied to grid 99 would be negative and of a relatively large value due to the high amplification obtained in tubes 49 and 62. As a specific example of one embodiment which has been operated with success, the control wave applied to grid 99 would have a value of approximately −44 volts. To increase precision, a fixed positive reference voltage is subtracted from the control wave. The subtraction is conveniently accomplished by connecting resistor 97 in a voltage divider circuit including resistors 103 and 104, from B+ to ground. Resistor 104 is in the cathode circuit of tube 102 and serves also as the output load resistor. The positive voltage across resistor 97 is advantageously selected to be quite close to the negative control voltage, and in a specific embodiment has been made 40 volts. In consequence, the net control voltage applied between grid 99 and cathode 101 is −4 volts.

Amplifier 102 is designed to have a high gain and in a specific embodiment has a gain of 50. Consequently its cathode potential will change 1 volt for an input signal change of 1/50 volt. The cathode is direct connected to grid 86 of the pulse repetition frequency control tube 84.

As previously mentioned, a relatively small voltage change, 5 volts in the specific example given, suffices to change the pulse repetition frequency over its whole range of operation. This 5-volt change can be obtained by a 1/10-volt change in the grid voltage of tube 102, and hence a 1/10-volt change in the integrated signal $$\frac{E_o f}{\alpha}$$

With a normal value of integrated signal of —44 volts, a change in the integrated value of only ¼% suffices to change the pulse repetition frequency over its entire range.

It will therefore be seen that this circuit holds the integrated value of the received signals constant to within ¼% over its entire operating range. This accuracy is obtained through the use of high amplification and the subtraction of a large fixed amount from the integrated signal in obtaining the net control signal. Actually, in practice, the full range of operation is ordinarily from several thousand cycles per second to about 10 C. P. S. This corresponds to a viscosity range from zero to 100,000 centipoises. Suitable modifications may of course be made to obtain viscosity measurements in any selected range.

It has previously been demonstrated that the pulse repetition frequency is directly proportional to the damping coefficient $\alpha$, which in turn is a function of the viscosity. In order to measure the frequency, voltmeter 105 is connected to the junction of capacitor 82 and resistor 83, and to a zero-setting circuit including potentiometer 106 and resistor 107 from B+ to ground. Inasmuch as the capacitor 82 is always charged to a given potential before it is discharged, the charge $Q_o$ supplied to the condenser for each pulse is always the same. Over a given interval of time, say one second, the total charge supplied to the condenser is $fQ_o$. Since charge per unit time is current, the current through the resistor 83 will be exactly proportional to the repetition frequency $f$. That is:

$$I = Q_o f \quad (13)$$

Voltage across a resistor is directly proportional to current therethrough, so that the average voltage drop across resistor 83 will also be proportional to the repetition frequency $f$. Thus meter 105 will vary directly with the repetition frequency. By adjusting potentiometer 106 the meter reading may be brought to zero before immersing the elongated strip 10 in the liquid. Thereafter, the meter reading will be directly proportional to frequency and hence to the damping factor $\alpha$.

For a commercial instrument of general application, several meter ranges may be provided to obtain more accurate readings. This is readily accomplished by shunting meter 105 with appropriate resistances. For materials of high viscosity, the zero adjustment 106 may be set so that the meter reads zero when the probe is contacted with a material of known viscosity, and a more sensitive meter range employed for greater accuracy of measurement.

Calibration of the meter can be made as described in connection with Fig. 10. Where necessary, the proportionality constant can be calculated from the dimensions and arrangement of the sensing element and circuit constants. In this case the instrument becomes an absolute viscosity meter. As pointed out for Fig. 10, a single transducer coil can be employed for transmitting and receiving instead of the separate coils shown.

In the foregoing, one specific embodiment of the sensing device or probe has been described in detail, together with two types of instrumentation for use therewith. Both probe and instrumentation are subject to many modifications to meet different requirements. Certain modifications will be described hereinafter, and others will occur to those skilled in the art.

While it is preferred to make resonant strip 10 a half-wavelength long, and support it at its midpoint, other resonant lengths and points of support may be employed if desired. In general, the strips are resonant when the positive and negative travelling waves produced by reflection at the ends superimpose in phase before they are too heavily damped, so as to form standing waves. The standing waves are sinusoidal and hence require only relatively narrow band amplifiers, particularly when a given frequency (fundamental or a selected harmonic) is employed for measuring purposes.

It is advantageous to locate the support at a nodal plane of the fundamental resonant frequency, so as not to impair the oscillations and to facilitate filtering. Where harmonics are sufficiently strong, they may be used to actuate the receiver instead of the fundamental. In such case a node of the desired harmonic may be used as the point of support. The frequency of oscillation can be selected within wide limits. Since the viscosity of non-Newtonian liquids varies with frequency, this enables obtaining information to suit the particular application. The use of an ultrasonic frequency as described permits the probe to be made very small and rugged.

The use of magnetostrictive materials for the strip 10 enables compressional elastic waves to be produced therein in a simple convenient manner. However, any desired transducer means can be employed which is capable of producing the waves in the strip, and the strip material selected accordingly. In some cases it may be desirable to employ a chemically inert material such as glass for strip 10, in which case elastic waves could be excited therein by a piezoelectric crystal or magnetostrictive material mounted on the end thereof, etc.

Figure 7:
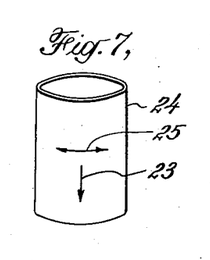

As mentioned before, it is possible to use torsional or shear modes of oscillation in the elongated solid if desired. Fig. 7 illustrates a short section of an elongated tube 24 using the torsional mode. Arrow 23 indicates the direction of propagation longitudinal of the tube. Double-ended arrow 25 indicates the direction of oscillation, which is around the tube and thus in shear with a contacting liquid. Instead of a tube, a solid rod could also be employed. With the torsional mode of oscillation in the tube or rod, some compressional mode energy may be radiated into the liquid or fluid-like material due to alternate constriction and expansion of the tube or rod as the wave propagates therealong. This compressional mode radiation is at double frequency, however, and may be filtered out. Thus the attenuation of the fundamental frequency due to shear with the liquid or fluid-like material may be measured without substantial impairment.

Figure 8:
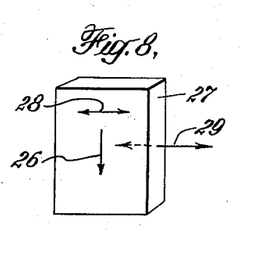

Fig. 8 illustrates a short section of a strip 27 similar to strip 10, but using the shear mode of oscillation. Arrow 26 indicates the direction of propagation longitudinal of the strip, and double-ended arrow 28 indicates the direction of oscillation which is lateral to the length of the strip. As in Fig. 6, the oscillation of the faces of strip 27 is in shear with the liquid. The oscillation of the edges of the strip 27 is in the direction indicated by arrow 29 and hence is normal to the edges and radiates compressional mode energy into the liquid. Accordingly the edges are made sufficiently thin to reduce the radiation to a minor or negligible degree.

The longitudinal compressional mode in the solid is preferred for most applications, inasmuch as it is far more convenient to generate than the torsional mode, and the compressional radiation is not as directly generated as in the case of the shear mode. The latter is due to the fact that in the shear mode the primary oscillation causes the edges of the strip to move normal to the liquid, and hence radiate compressional mode energy. On the other hand, with the longitudinal mode in the solid, the primary oscillation of both faces and edges is in shear with the liquid, and the radiation of compressional mode energy into the liquid is due to the expansion and contraction of the solid as the wave propagates therealong, hence being an indirect effect of the primary oscillation.

For both compressional and shear modes of oscillation, it is preferred to employ elongated strips which are thin compared to the width thereof, to reduce the radiation of compressional mode energy into the liquid. For the torsional mode of oscillation it is preferred to employ cylindrical tubes or rods. These shapes are particularly advantageous when measuring liquids having viscosities up to several hundred centipoises. For liquids of higher viscosity, the shapes just described may still be employed, and are advantageous in an instrument intended for general use. However, the cross-sectional shape of the elongated solid becomes of less importance for high viscosity liquids. The viscosity of such liquids usually exceeds a thousand centipoises. Hence, for such liquids it is also possible to use square or round rods or tubes, etc., in the case of compressional and shear modes of oscillation in the solid, and square or rectangular rods or tubes may be employed for the torsional mode.

Figure 12:
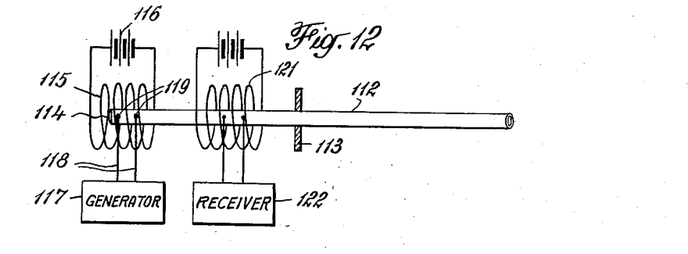
Fig. 12 is a schematic showing apparatus for generating torsional modes of oscillation.

Fig. 12 illustrates one manner of generating torsional waves in an elongated rod. The embodiment here shown is that of a short resonant section 112 supported at its midpoint by a diaphragm 113. One end 114 is immersed in a longitudinal magnetic field by surrounding it with a coil 115 energized from a suitable source of power indicated as battery 116. A pulse of current from a generator in 117 is applied through leads 118 to two points 119 longitudinally spaced along the rod 112. Due to the interaction between the longitudinal current and the longitudinal magnetic field, the end 114 is given a twist at the time of energization. This torsional effect propagates lengthwise of strip 112 and sets up torsional oscillations therein. The oscillations will decay exponentially depending on the viscosity of the liquid in which rod 112 is immersed.

To obtain electric waves corresponding to the oscillations, a second coil 121 may be placed around the rod 112 and energized by a suitable battery as shown. Spaced points on the rod may then be connected to receiver 122 which is responsive to variations in attenuation of the wave applied thereto.

To obtain torsional waves of sufficient amplitude, it is found that very high currents must be applied through leads 118 which may well reach the order of hundreds of amperes. Consequently the use of longitudinal compressional waves as described in connection with Fig. 1 is preferred. Nevertheless, torsional waves may be advantageous for certain applications, particularly where the ruggedness of tubes and rods as compared to thin strips is a factor.

Methods and apparatus for generating shear modes are known in the art and hence specific arrangements need not be described herein.

Figure 13:
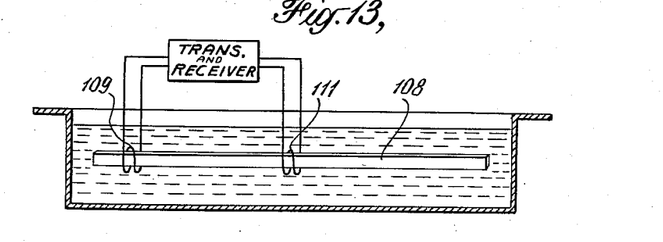
Fig. 13 is a schematic showing the use of relatively long strips of material.

Referring now to Fig. 13, a schematic diagram is shown using a relatively long elongated solid 108 with transmitting and pickup points spaced therealong. For example, in the case of longitudinal compressional waves, with the elongated solid 108 of magnetostrictive material, coil 109 may be used to energize the solid, and coil 111 may be used as the pickup coil. Torsional or shear modes of oscillation can also be employed, and the cross-section of the elongated body 108 is determined in accordance with the considerations described above.

It is possible to energize coil 109 with a continuous alternating current wave if desired. The wave will propagate longitudinally of strip 108 and will attenuate as it progresses due to damping between strip 108 and the liquid. The signal picked up at 111 will hence be of less amplitude than that applied at 109 and the amplitude will decrease as the viscosity of the liquid increases. This then gives a measure of viscosity as explained above. Shear elasticity will also effect the amplitude in the case of some liquids and fluid-like materials, as discussed hereinbefore.

If the transmitter is arranged to deliver constant amplitude oscillations to strip 108, the receiver indicator can be calibrated for the selected transmitting conditions. Or, if desired, the amplitude of the signal at 111 can be compared with the amplitude of the signal at 109 and the instrument calibrated accordingly, so that variations in transmitted energy will not affect accuracy. Other forms of instrumentation such as comparing amplitudes at 111 with the amplitude in a selected standard can also be employed. In all cases, it will be understood that it is the attenuation of the elastic waves in the solid which is used to indicate the physical properties of liquid or fluid-like materials and not attenuation of waves propagated in the liquid or fluid-like material itself.

With continuous waves, it is desirable to avoid reflections at the ends of the strip 108, and this may be accomplished by making the strip sufficiently long so that elastic waves therein are completely damped out before they reach the ends, or by suitable termination at the ends.

It is preferred to apply periodic pulses at 109. Corresponding pulses will be picked up at 111 whose amplitude varies in accordance with the viscosity of the contacting liquid. In this case, it is possible to construct the instrument to avoid reflections at the ends of the strip as just discussed, so that one pulse will be picked up at 111 for each pulse applied at 109. On the other hand, it is also possible to allow pulses to be multiply-reflected from the ends, in which case a number of discrete pulses will be picked up at 111 for each transmitted pulse. The pulses will decay exponentially with time, and also exponentially with distance traveled in the solid. They are in effect travelling waves, and the damping factor is the same as in the case of standing waves analyzed above for Fig. 1. Even though the received pulses may not be uniformly spaced in time, their envelope will be exponential (assuming perfect reflection at the ends) and hence the damping factor may be determined as described above.

As noted before in discussing the resonant strips of Fig. 1 etc., when a non-resonant strip is immersed in a viscous liquid a change in velocity of propagation accompanies the change in attenuation. Thus either may be measured to determine the viscosity or other properties of the liquid, although the latter is preferred as before stated. If it is desired to determine viscosity and shear elasticity separately, both changes in velocity of propagation and attenuation may be measured.

Short resonant elements such as shown in Fig. 1 are preferred to longer non-resonant elements such as shown in Fig. 13. The resonant elements permit the construction of a much more compact device which can be readily inserted and removed from the liquid. The resonant type instrument can be much more readily designed for use at high temperatures and pressures. Furthermore, there is a certain amount of distortion of waveform in travelling along a long section as shown in Fig. 13, due to velocity dispersion and variations of $\alpha$ with $\omega$. Nevertheless, embodiments like Fig. 13 may be useful in certain applications.

In the specific embodiments described herein D.-C. pulses are employed for excitation and such pulses are preferred. However, it is possible to employ short bursts of high-frequency, sometimes termed a pulse-modulated carrier, if desired. Complete decay of the oscillation produced by a single pulse (D.-C. or high-frequency burst) before the next pulse is transmitted is preferred for accuracy, but in some cases this may not be necessary.

Receiver circuits giving a simple meter indication, or in which the output is fed to a recorder instead of a meter, are preferred for industrial applications. However it is also possible to apply the output of the transducer to an oscilloscope to obtain a visual indication of variations in decay. The waveforms shown in Figs. 9a and 9b are examples of the type of waveforms which can be seen on the oscilloscope, it being understood that in general a large number of cycles will occur in each decaying train rather than the few shown in the drawing for convenience of illustration.

The rate of decay of the waveforms seen on the face of the oscilloscope may be determined in many ways. For example, if the factor $\alpha$ is sought, the time necessary for the wave to decay to $1/e$ of its initial value may be determined by suitable time markers or by counting the number of cycles (assuming the frequency to be known). Or, the oscilloscope trace may be compared with curves of known rates of decay. The latter is particularly simple when all that is sought is to ascertain whether the liquid or fluid-like material under observation has the same physical characteristics as a selected standard.

To determine changes in frequency or velocity of propagation, known forms of instrumentation may be employed. If desired an oscilloscope may be utilized since the intercepts of the received waveform with the zero axis will occur at different instants as the frequency or velocity of propagation changes.

In the foregoing, several specific embodiments of the invention have been described. A number of different sensing devices have been described and other specific arrangements may be devised by those skilled in the art in accordance with the principles developed herein. While two forms of instrumentation have been described for use with the sensing element, it will be understood that other forms may be employed if desired, to meet the requirements of various applications.

For simplicity the description of the specific embodiments has been largely confined to the measurement of viscosity of liquids, this being a very important field of the invention. However, it will be understood that the apparatus specifically described is also useful in the more general fields described in the early portions of the specification (liquid materials, fluid-like materials, paint and other films, thermosetting resins, solid particles in gas medium, etc.).

The circuits of Figs. 10 and 11 have been designed particularly for use in the viscosimeter of the invention. However, they may be employed in entirely different applications where the measurement of attenuation of electrical waves is sought. Furthermore, the pulse generator described in connection with Fig. 11 may be of broad utility in entirely different applications.

We claim:

1. Apparatus for determining physical properties, including a function of viscosity, of fluid-like materials, particularly of liquid materials and thin films, which comprises an elongated body of solid material at least a portion of which is adapted to be contacted by said fluid-like material, a transducer for exciting an elastic wave in said elongated body having a major component of oscillation in shear with a contacting fluid-like material, and an electrical measuring device responsive to variations in the rate of attenuation of said oscillation in said elongated body.

2. Apparatus for determining physical properties, including a function of viscosity, of fluid-like materials, particularly of liquid materials and thin films, which comprises an elongated body of solid material at least a portion of which is adapted to be contacted by said fluid-like material, a transducer for exciting an elastic wave propagating longitudinally in said elongated body and having a major component of oscillation in shear with a contacting fluid-like material, and an electrical measuring device supplied with an electrical wave corresponding to said elastic wave and responsive to variations in the rate of attenuation thereof in said elongated body.

3. Apparatus for determining physical properties, including a function of viscosity, of fluid-like materials, particularly of liquid materials and thin films, which comprises an elongated body of solid material at least a portion of which is adapted to be contacted by said fluid-like material, transducer means associated with said elongated body for exciting elastic waves propagating longitudinally in said elongated body with a major component of oscillation in shear with a contacting fluid-like material and for converting elastic waves in said body into electrical waves, a source of electrical energy connected to said transducer means to excite said elastic waves in said elongated body, and an electrical measuring circuit connected to said transducer means for measuring variations in attenuation of said oscillation in said elongated body.

4. Apparatus for determining physical properties, including a function of viscosity, of fluid-like materials, particularly of liquid materials and thin films, which comprises an elongated body of solid material at least a portion of which is adapted to be contacted by said fluid-like material, a first transducer for exciting an elastic wave propagating longitudinally in said elongated body and having a major component of oscillation in shear with a contacting fluid-like material, a source of electrical energy connected to said transducer to excite said elastic waves in said elongated body, a second transducer spaced along said body from said first transducer for deriving electrical waves corresponding to said elastic waves in said elongated body, and an electrical measuring circuit connected to the last-named transducer for measuring variations in attenuation of said oscillation in said elongated body.

5. Apparatus for determining physical properties, including a function of viscosity, of fluid-like materials, particularly of liquid materials and thin films, which comprises an elongated body of solid material at least a portion of which is adapted to be contacted by said fluid-like material, a source of electrical wave energy, a transducer supplied from said source and associated with said elongated body to excite longitudinal compressional elastic waves therein, and an electrical measuring device responsive to variations in attenuation of said longitudinal wave in said elongated body.

6. Apparatus for determining physical properties, including a function of viscosity, of fluid-like materials, particularly of liquid materials and thin films, which comprises an elongated body of solid material at least a portion of which is adapted to be contacted by said fluid-like material, said portion being thin compared to the width thereof, a source of electrical wave energy, a transducer supplied from said source and associated with said elongated body to excite longitudinal compressional elastic waves therein, and an electrical measuring device responsive to variations in attenuation of said longitudinal wave in said elongated body.

7. Apparatus for determining physical properties, including a function of viscosity, of fluid-like materials, particularly of liquid materials and thin films, which comprises an elongated body of solid material at least a portion of which is adapted to be contacted by said fluid-like material, said portion being thin compared to the width thereof, transducer means associated with said elongated body for exciting shear elastic waves therein propagating longitudinally thereof with the direction of shear oscillation substantially parallel to the width thereof, a source of electrical energy connected to said transducer means to excite said shear waves in said elongated body, and an electrical measuring device responsive to variations in attenuation of said shear waves in said elongated body.

8. Apparatus for determining physical properties, including a function of viscosity, of fluid-like materials, particularly of liquid materials and thin films, which comprises an elongated body of solid material at least a portion of which is adapted to be contacted by said fluid-like material, transducer means associated with said elongated body for exciting torsional elastic waves therein propagating longitudinally thereof and for converting elastic waves in said body into electrical waves, a source of electrical energy connected to said transducer means to excite said torsional waves in said elongated body, and an electrical measuring circuit connected to said transducer means for measuring variations in attenuation of said torsional waves in said elongated body.

9. Apparatus for determining physical properties, including a function of viscosity, of fluid-like materials, particularly of liquid materials and thin films, which comprises an elongated body of solid material at least a portion of which is adapted to be contacted by said fluid-like material, a transducer for exciting an elastic wave in said elongated body having a component of oscillation in shear with a contacting fluid-like material, a source of pulses for periodically energizing said transducer, and an electrical measuring device responsive to variations in attenuation of said elastic wave in said elongated body.

10. Apparatus for determining physical properties, including a function of viscosity, of fluid-like materials, particularly of liquid materials and thin films, which comprises an elongated body of solid material at least a portion of which is adapted to be contacted by said fluid-like material, a transducer for exciting an elastic wave in said elongated body having a component of oscillation in shear with a contacting fluid-like material, a source of pulses for periodically energizing said transducer, and an electrical measuring device responsive to variations in attenuation of said elastic wave in said elongated body, the periodicity of said pulses being predetermined so that said elastic wave substantially completely decays in the interval between successive pulses.

11. Apparatus for determining physical properties, including a function of viscosity, of fluid-like materials, particularly of liquid materials and thin films, which comprises an elongated body of solid material at least a portion of which is adapted to be contacted by said fluid-like material, transducer means associated with said elongated body for exciting elastic waves propagating longitudinally in said elongated body with a component of oscillation in shear with a contacting fluid-like material and for converting elastic waves in said body into electrical waves, a source of pulses for periodically energizing said transducer means, and an electrical measuring circuit connected to said transducer means for measuring variations in attenuation of said elastic waves in said elongated body.

12. Apparatus for determining physical properties, including a function of viscosity, of fluid-like materials, particularly of liquid materials and thin films, which comprises an elongated body of solid material at least a portion of which is adapted to be contacted by said fluid-like material, a first transducer for exciting an elastic wave propagating longitudinally in said elongated body and having a component of oscillation in shear with a contacting fluid-like material, a source of pulses for periodically energizing said transducer, a second transducer spaced along said body from said first transducer for deriving electrical waves corresponding to said elastic waves in said elongated body, and an electrical measuring circuit connected to the last-named transducer for measuring variations in attenuation of said oscillation in said elongated body.

13. Apparatus for determining physical properties, including a function of viscosity, of fluid-like materials, particularly of liquid materials and thin films, which comprises an elongated body of solid material at least a portion of which is adapted to be contacted by said fluid-like material, said portion being thin compared to the width thereof, a transducer for exciting a longitudinal compressional elastic wave in said elongated body, a source of pulses for periodically energizing said transducer, a transducer for deriving an electrical wave corresponding to said elastic wave, and an electrical measuring circuit connected to the last-named transducer for measuring variations in attenuation of said elastic wave in said elongated body, the periodicity of said pulses being predetermined so that said elastic wave substantially completely decays in the interval between successive pulses.

14. Apparatus for determining physical properties, including a function of viscosity, of fluid-like materials, particularly of liquid materials and thin films, which comprises an elongated body of solid material at least a portion of which is adapted to be contacted by said fluid-like material, a transducer for exciting an elastic wave in said elongated body having a component of oscillation in shear with a contacting fluid-like material, a source of pulses for periodically energizing said transducer, the length of said elongated body being selected so that resonant oscillations are produced therein by said pulses, and an electrical measuring device responsive to variations in the attenuation of said resonant oscillations in said elongated body.

15. Apparatus for determining physical properties, including a function of viscosity, of fluid-like materials, particularly of liquid materials and thin films, which comprises an elongated body of solid material at least a portion of which is adapted to be contacted by said fluid-like material, a transducer for exciting an elastic wave in said elongated body having a component of oscillation in shear with a contacting fluid-like material, a source of pulses for periodically energizing said transducer, the length of said elongated body being selected so that resonant oscillations are produced therein by said pulses, a support for said elongated body affixed thereto at a nodal plane of an odd order harmonic including the fundamental of the resonant oscillations, and an electrical measuring circuit coupled to said elongated body and responsive to variations in the attenuation of said resonant oscillations therein.

16. Apparatus for determining physical properties, including a function of viscosity, of fluid-like materials, particularly of liquid materials and thin films, which comprises an elongated body of solid material at least a portion of which is adapted to be contacted by said fluid-like material, transducer means associated with said elongated body for exciting elastic waves propagating longitudinally in said elongated body with a component of oscillation in shear with a contacting fluid-like material and for converting elastic waves in said body into electrical waves, a source of electrical pulses for periodically energizing said transducer means, the length of said elongated body being predetermined so that resonant elastic wave oscillations are produced therein by said pulses, and an electrical measuring circuit connected to said transducer means for measuring variations in attenuation of said resonant oscillations in said elongated body.

17. Apparatus for determining physical properties, including a function of viscosity, of fluid-like materials, particularly of liquid materials and thin films, which comprises an elongated body of solid material at least a portion of which is adapted to be contacted by said fluid-like material, transducer means associated with said elongated body for exciting elastic waves propagating longitudinally in said elongated body with a component of oscillation in shear with a contacting fluid-like material and for converting elastic waves in said body into electrical waves, a source of electrical pulses for periodically energizing said transducer means, the length of said elongated body being predetermined so that resonant elastic wave oscillations are produced therein by said pulses, the interval between successive pulses being predetermined to allow said resonant oscillations to substantially completely decay therein, and an electrical measuring circuit connected to said transducer means for measuring variations in attenuation of said resonant oscillations in said elongated body.

18. Apparatus for determining physical properties, including a function of viscosity, of fluid-like materials, particularly of liquid materials and thin films, which comprises an elongated body of solid material at least a portion of which is adapted to be contacted by said fluid-like material, transducer means associated with said elongated body for exciting elastic waves propagating longitudinally in said elongated body with a component of oscillation in shear with a contacting fluid-like material and for converting elastic waves in said body into electrical waves, a source of electrical pulses for periodically energizing said transducer means, the length of said elongated body being selected so that resonant elastic wave oscillations are produced therein by said pulses and the time duration of each of said pulses being short compared to the period of said oscillations, the interval between successive pulses being predetermined to allow said resonant oscillations to substantially completely decay therein, a support for said elongated body affixed thereto at a nodal plane of an odd order harmonic including the fundamental of the resonant oscillations, and an electrical measuring circuit connected to said transducer means responsive to variations in the rate of decay of said resonant oscillations in said elongated body.

19. Apparatus for determining physical properties, including a function of viscosity, of fluid-like materials, particularly of liquid materials and thin films, which comprises an elongated body of solid material at least a portion of which is adapted to be contacted by said fluid-like material, transducer means associated with said elongated body for exciting longitudinal compressional elastic waves therein in response to applied electrical energy and for deriving electrical waves from elastic waves in said body, a source of electrical pulses for periodically energizing said transducer means, the length of said elongated body being predetermined so that resonant compressional elastic waves are produced therein by said pulses, and an electrical measuring circuit connected to said transducer means responsive to variations in attenuation of said resonant waves in said elongated body.

20. Apparatus for determining physical properties, including a function of viscosity, of fluid-like materials, particularly of liquid materials and thin films, which comprises an elongated body of solid material at least a portion of which is adapted to be contacted by said fluid-like material, said portion being thin compared to the width thereof, transducer means associated with said elongated body for exciting longitudinal compressional elastic waves therein in response to applied electrical energy and for deriving electrical waves from elastic waves in said body, a source of electrical pulses for periodically energizing said transducer means, the length of said elongated body being predetermined so that resonant compressional elastic waves are produced therein by said pulses, and an electrical measuring circuit connected to said transducer means responsive to variations in attenuation of said resonant waves in said elongated body.

21. Apparatus for determining physical properties, including a function of viscosity, of fluid-like materials, particularly of liquid materials and thin films, which comprises an elongated body of solid material at least a portion of which is adapted to be contacted by said fluid-like material, said portion being thin compared to the width thereof, transducer means associated with said elongated body for exciting longitudinal compressional elastic waves therein in response to applied electrical energy and for deriving electrical waves from elastic waves in said body, a source of electrical pulses for energizing said transducer means, the length of said elongated body being predetermined so that resonant compressional elastic waves are produced therein by said pulses and the periodicity of said pulses being predetermined to allow the resonant waves to substantially completely decay between successive pulses, a support for said elongated body affixed thereto at a nodal plane of an odd order harmonic including the fundamental of the resonant oscillations, and an electrical measuring circuit connected to said transducer means for measuring variations in attenuation of said resonant waves in said elongated body.

22. Apparatus for determining physical properties, including a function of viscosity, of fluid-like materials, particularly of liquid materials and thin films, which comprises an elongated body of solid material at least a portion of which is adapted to be contacted by said fluid-like material, said portion being thin compared to the width thereof, transducer means associated with said elongated body for exciting longitudinal compressional elastic waves therein in response to applied electrical energy and for deriving electrical waves from elastic waves in said body, a source of electrical pulses for energizing said transducer means, the length of said elongated body being approximately a half-wavelength at the frequency of resonant compressional elastic waves produced therein by said pulses and the periodicity of said pulses being predetermined to allow the resonant waves to substantially completely decay between successive pulses, a support for said body affixed thereto at substantially the midpoint of the length thereof, and an electrical measuring circuit connected to said transducer means responsive to variations in the rate of decay of said resonant waves in said elongated body.

23. Apparatus for determining physical properties, including a function of viscosity, of fluid-like materials, particularly of liquid materials and thin films, which comprises an elongated body of solid material at least a portion of which is adapted to be contacted by said fluid-like material, said portion being thin compared to the width thereof, transducer means associated with said elongated body for exciting shear elastic waves therein propagating longitudinally thereof with the direction of shear oscillation substantially parallel to the width thereof and for deriving electrical waves from elastic waves in said body, a source of electrical pulses for periodically energizing said transducer means, the length of said elongated body being predetermined so that resonant shear elastic waves are produced therein by said pulses and the intervals between successive pulses being predetermined to allow the resonant waves to substantially completely decay therein, and an electrical measuring circuit connected to said transducer means responsive to variations in attenuation of said resonant waves in said elongated body.

24. Apparatus for determining physical properties, including a function of viscosity, of fluid-like materials, particularly of liquid materials and thin films, which comprises an elongated body of solid material at least a portion of which is adapted to be contacted by said fluid-like material, said portion being substantially round, transducer means associated with said elongated body for exciting longitudinally propagating torsional elastic waves therein and for converting elastic waves in said body into electrical waves, a source of electrical pulses for periodically energizing said transducer means, the length of said elongated body being predetermined so that resonant torsional elastic waves are produced therein by said pulses and the intervals between successive pulses being predetermined to allow the resonant waves to substantially completely decay therein, and an electrical measuring circuit connected to said transducer means responsive to variations in attenuation of said resonant waves in said elongated body.

25. Apparatus for determining physical properties, including a function of viscosity, of fluid-like materials, particularly of liquid materials and thin films, which comprises an elongated body of solid material at least a portion of which is adapted to be contacted by said fluid-like material, transducer means associated with said elongated body for exciting elastic waves propagating longitudinally in said elongated body with a component of oscillation in shear with a contacting fluid-like material and for converting elastic waves in said body into electrical waves, a source of pulses for periodically energizing said transducer means, an amplifier connected to said transducer means for amplifying said electrical waves, and an electrical circuit connected to said amplifier designed and adapted to indicate a function of the exponential damping coefficient of said electrical waves.

26. Apparatus for determining physical properties, including a function of viscosity, of fluid-like materials, particularly of liquid materials and thin films, which comprises an elongated body of solid material at least a portion of which is adapted to be contacted by said fluid-like material, transducer means associated with said elongated body for exciting elastic waves propagating longitudinally in said elongated body with a component of oscillation in shear with a contacting fluid-like material and for converting elastic waves in said body into electrical waves, a source of pulses for energizing said transducer means having a periodicity predetermined to allow elastic waves excited in said body to substantially completely decay between successive pulses, an amplifier connected to said transducer means for amplifying said electrical waves, and an electrical circuit connected to said amplifier designed and adapted to indicate a function of the exponential damping coefficient of said electrical waves.

27. Apparatus for determining physical properties, including a function of viscosity, of fluid-like materials, particularly of liquid materials and thin films, which comprises an elongated body of solid material at least a portion of which is adapted to be contacted by said fluid-like material, transducer means associated with said elongated body for exciting elastic waves propagating longitudinally in said elongated body with a component of oscillation in shear with a contacting fluid-like material and for converting elastic waves in said body into electrical waves, a source of pulses for energizing said transducer means having a periodicity predetermined to allow elastic waves excited in said body to substantially completely decay between successive pulses, an amplifier connected to said transducer means for amplifying said electrical waves, an integrating circuit supplied from said amplifier for deriving a response varying with the exponential damping coefficient of said electrical waves, and an indicating circuit controlled by said response for indicating a function of said coefficient.

28. Apparatus for determining physical properties, including a function of viscosity, of fluid-like materials, particularly of liquid materials and thin films, which comprises an elongated body of solid material at least a portion of which is adapted to be contacted by said fluid-like material, transducer means associated with said elongated body for exciting elastic waves propagating longitudinally in said elongated body with a component of oscillation in shear with a contacting fluid-like material and for converting elastic waves in said body into electrical waves, a source of electrical pulses for periodically energizing said transducer means, the length of said elongated body being selected so that resonant elastic wave oscillations are produced therein by said pulses, an amplifier connected to said transducer means for amplifying electrical waves corresponding to said resonant elastic wave oscillations, a non-linear impedance supplied with the output of said amplifier whereby the impedance thereof varies with the attenuation of said oscillations, and an indicating circuit responsive to changes in said impedance.

29. Apparatus for determining physical properties, including a function of viscosity, of fluid-like materials, particularly of liquid materials and thin films, which comprises an elongated body of solid material at least a portion of which is adapted to be contacted by said fluid-like material, transducer means associated with said elongated body for exciting elastic waves propagating longitudinally in said elongated body with a component of oscillation in shear with a contacting fluid-like material and for converting elastic waves in said body into electrical waves, a source of electrical pulses for periodically energizing said transducer means, the length of said elongated body being selected so that resonant elastic wave oscillations are produced therein by said pulses, an amplifier connected to said transducer means for amplifying electrical waves corresponding to said resonant elastic wave oscillations, a non-linear resistance supplied with the output of said amplifier whereby the resistance thereof varies with the attenuation of said oscillations, a direct-current circuit including said non-linear resistance and a source of substantially fixed direct-current voltage in series therewith, and an indicating device connected to indicate changes in direct current through said non-linear resistance.

30. Apparatus for determining physical properties, including a function of viscosity, of fluid-like materials, particularly of liquid materials and thin films, which comprises an elongated body of solid material at least a portion of which is adapted to be contacted by said fluid-like material, said portion being thin compared to the width thereof, transducer means associated with said elongated body for exciting longitudinal compressional elastic waves therein in response to applied electrical energy and for deriving electrical waves from elastic waves in said body, a source of electrical pulses for energizing said transducer means, the length of said elongated body being predetermined so that resonant compressional elastic waves are produced therein by said pulses and the periodicity of said pulses being predetermined to allow the resonant waves to substantially completely decay between successive pulses, a support for said elongated body affixed thereto at a nodal plane of the fundamental resonant oscillations, an amplifier connected to said transducer means and tuned to amplify the fundamental resonant frequency of said oscillations, a non-linear resistance supplied with the output of said amplifier whereby the resistance thereof varies with the attenuation of said oscillations, a direct-current circuit including said non-linear resistance and a source of substantially fixed direct-current voltage in series therewith, and an indicating device connected to indicate changes in direct current through said non-linear resistance.

31. In apparatus for determining physical properties, including a function of viscosity, of fluid-like materials, particularly of liquid materials and thin films, the combination which comprises an elongated body of solid material at least a portion of which is adapted to be contacted by said fluid-like material, transducer means associated with said elongated body for exciting elastic waves propagating longitudinally in said elongated body with a component of oscillation in shear with a contacting fluid-like material and for converting elastic waves in said body into electrical waves, a source of variable repetition rate pulses connected to said transducer means, an electrical circuit connected to said transducer means for deriving a response from said electrical waves which varies with the average value thereof, and connections from said electrical circuit to said source of pulses to vary the pulse repetition rate to maintain said response substantially constant.

32. Apparatus for determining physical properties, including a function of viscosity, of fluid-like materials, particularly of liquid materials and thin films, which comprises an elongated body of solid material at least a portion of which is adapted to be contacted by said fluid-like material, transducer means associated with said elongated body for exciting elastic waves propagating longitudinally in said elongated body with a component of oscillation in shear with a contacting fluid-like material and for converting elastic waves in said body into electrical waves, a source of variable repetition rate pulses connected to said transducer means, an amplifier connected to said transducer means for amplifying said electrical waves, a rectifier circuit supplied from said amplifier for obtaining a direct-current control wave varying with the average value of said electrical waves, circuit connections from said rectifier circuit to said source of pulses to vary the pulse repetition rate to maintain said control wave substantially constant, and an indicating circuit responsive to changes in said repetition rate.

33. Apparatus for determining physical properties, including a function of viscosity, of fluid-like materials, particularly of liquid materials and thin films, which comprises an elongated body of solid material at least a portion of which is adapted to be contacted by said fluid-like material, transducer means associated with said elongated body for exciting elastic waves propagating longitudinally in said elongated body with a component of oscillation in shear with a contacting fluid-like material and for converting elastic waves in said body into electrical waves, the length of said elongated body being predetermined so that resonant elastic wave oscillations are produced therein by pulses applied to said transducer means, said oscillations decaying in accordance with the damping of said elongated body, a source of variable repetition rate pulses connected to said transducer means comprising a capacitor and a charging circuit therefor including a variable resistance device, a discharge circuit connected across said capacitor and adapted to discharge the capacitor when the voltage thereacross reaches a predetermined value, an amplifier connected to said transducer means for amplifying electrical waves corresponding to said resonant oscillations, a rectifier circuit supplied from said amplifier to yield a direct-current control wave varying with the average value of said oscillations, circuit connections for controlling the resistance of said variable resistance device in accordance with variations in said control wave to increase the repetition rate of said pulses when the rate of decay of said oscillations increases, and an indicating circuit responsive to changes in said repetition rate.

34. Apparatus for determining physical properties, including a function of viscosity, of fluid-like materials, particularly of liquid materials and thin films, which comprises an elongated body of solid material at least a portion of which is adapted to be contacted by said fluid-like material, transducer means associated with said elongated body for exciting elastic waves propagating longitudinally in said elongated body with a component of oscillation in shear with a contacting fluid-like material and for converting elastic waves in said body into electrical waves, the length of said elongated body being predetermined so that resonant elastic wave oscillations are produced therein by pulses applied to said transducer means, said oscillations decaying in accordance with the damping of said elongated body, a source of variable repetition rate pulses connected to said transducer means comprising a capacitor and a charging circuit therefor, a thermionic tube having a cathode, control grid and anode connected with the cathode-anode circuit thereof in said charging circuit, a discharge circuit including a grid-controlled gas discharge tube in series with said transducer means connected across said capacitor, a voltage source connected to maintain the grid of said discharge tube at a predetermined potential whereby said capacitor is discharged when the voltage thereacross reaches a predetermined value, an amplifier connected to said transducer means for amplifying electrical waves corresponding to said resonant oscillations, a rectifier and associated integrating circuit connected to the output of said amplifier to produce a direct-current control wave varying with the average value of said oscillations, a source of direct-current voltage connected to subtract a substantially constant value from said control wave to yield a modified control wave, a direct-current amplifier for said modified control wave, a connection from the output of said direct-current amplifier to the control grid of said thermionic tube to thereby control the repetition rate of said pulses, the direction of control being predetermined to increase said rate when the rate of decay of said oscillations increases to thereby maintain the average value of said oscillations substantially constant, and an indicating meter responsive to the charging current of said capacitor, whereby said meter indicates a physical property of a fluid-like material contacting said elongated body.

35. A method of determining physical properties, including a function of viscosity, of fluid-like materials, particularly of liquid materials and thin films, which comprises contacting an elongated body of solid material with said fluid-like material, exciting elastic waves in said body having a major component of oscillation in shear with said fluid-like material, and measuring the rate of attenuation in said elongated body of said oscillation.

36. A method of determining physical properties, including a function of viscosity, of fluid-like materials, particularly of liquid materials and thin films, which comprises contacting an elongated body of solid material with said fluid-like material, repeatedly pulse exciting elastic waves in said body having a component of oscillation in shear with said fluid-like material, and measuring the rate of decay in said elongated body of said oscillation in the intervals between successive pulses.

37. A method of determining physical properties, including a function of viscosity, of fluid-like materials, particularly of liquid materials and thin films, which comprises contacting an elongated body of solid material with said fluid-like material, repeatedly pulse exciting resonant elastic waves in said body having a component of oscillation in shear with said fluid-like material, the pulse repetition rate being sufficiently low to allow said resonant elastic waves to substantially completely decay in the intervals between pulses, and measuring a function of the damping coefficient of the decaying waves in said elongated body.

38. Apparatus for determining physical properties, including a function of viscosity, of fluid-like materials, particularly of liquid materials and thin films, which comprises an elongated body of solid material at least a portion of which is adapted to be contacted by said fluid-like material, transducer means associated with said elongated body for exciting elastic waves propagating longitudinally in said elongated body with a major component of oscillation in shear with a contacting fluid-like material and for converting elastic waves in said body into electrical waves, a source of electrical energy connected to said transducer means to excite said elastic waves in said elongated body, and an electrical measuring circuit connected to said transducer means for measuring variations in the velocity of propagation of said oscillation in said elongated body.

39. Apparatus for determining physical properties, including a function of viscosity, of fluid-like materials, particularly of liquid materials and thin films, which comprises an elongated body of solid material at least a portion of which is adapted to be contacted by said fluid-like material, transducer means associated with said elongated body for exciting elastic waves propagating longitudinally in said elongated body with a component of oscillation in shear with a contacting fluid-like material and for converting elastic waves in said body into electrical waves, a source of electrical pulses for periodically energizing said transducer means, the length of said elongated body being predetermined so that resonant elastic wave oscillations are produced therein by said pulses, and an electrical measuring circuit connected to said transducer means for measuring variations in the frequency of said resonant oscillations in said elongated body.

40. Apparatus for determining physical properties, including a function of voscosity, of fluid-like materials, particularly of liquid materials and thin films, which comprises an enclosure having an end wall, an elongated body of solid material partially within and partially outside of said enclosure and affixed to said end wall at a point between the ends of the elongated body, at least the portion of said body outside said enclosure being thin compared to the width thereof, transducer means within said enclosure and associated with said elongated body for exciting elastic waves therein propagating longitudinally thereof and having a major component of oscillation substantially parallel to the faces thereof, a source of pulses for periodically energizing said transducer means, and an electrical measuring circuit connected to said transducer means for measuring variations in attenuation of said elastic waves in said elongated body.

41. Apparatus for determining physical properties, including a function of viscosity, of fluid-like materials, particularly of liquid materials and thin films, which comprises a closed chamber having an end wall, a strip of magneto-strictive material partially within and partially outside of said chamber and affixed in said end wall at substantially the midpoint of the strip, said strip being substantially free of constraint except at said midpoint and being thin compared to the width thereof and of substantially uniform cross-section throughout the length thereof, a transducer coil mounted within said chamber and encircling said strip for exciting longitudinal compressional elastic waves therein propagating longitudinally thereof, a source of electrical pulses for energizing said transducer coil, the length of said strip being predetermined so that resonant compressional elastic waves are produced therein by said pulses and the periodicity of said pulses being predetermined to allow the resonant waves to substantially completely decay between successive pulses, and an electrical measuring circuit connected to said transducer coil for measuring variations in attenuation of said resonant waves in said strip.

42. A probe for use in determining physical properties, including a function of viscosity, of fluid-like materials, particularly of liquid materials and thin films, which comprises an enclosure having an end wall, an elongated body of solid material partially within and partially outside of said enclosure and affixed to said end wall at a point between the ends of the elongated body, at least the portion of said body outside said enclosure being thin compared to the width thereof, and transducer means within said enclosure and associated with said elongated body for exciting elastic waves therein propagating longitudinally thereof and having a major component of oscillation substantially parallel to the faces thereof.

43. A probe for use in determining physical properties, including a function of viscosity, of fluid-like materials, particularly of liquid materials and thin films, which comprises an enclosure having an end wall, an elongated body of solid material partially within and partially outside of said enclosure and affixed to said end wall at a point between the ends of the elongated body, at least the portion of said body outside said enclosure being thin compared to the width thereof, and transducer means within said enclosure and associated with said elongated body for exciting longitudinal compressional elastic waves therein propagating longitudinally thereof.

44. A probe for use in determining physical properties, including a function of viscosity, of fluid-like materials, particularly of liquid materials and thin films, which comprises a closed chamber having an end wall, a strip of magneto-strictive material partially within and partially outside of said chamber and affixed in said end wall at substantially the midpoint of the strip, said strip being substantially free of constraint except at said midpoint and being thin compared to the width thereof and of substantially uniform cross-section throughout the length thereof, and a transducer coil mounted within said chamber and encircling said strip for exciting longitudinal compressional elastic waves therein propagating longitudinally thereof.

45. Apparatus for determining physical properties, including a function of viscosity, of fluid-like materials, particularly of liquid materials and thin films, which comprises an elongated body of solid material at least a portion of which is adapted to be contacted by said fluid-like material, said portion being substantially round, transducer means associated with said elongated body for exciting longitudinally propagating torsional elastic waves therein and for converting elastic waves in said body into electrical waves, a source of electrical pulses for periodically energizing said transducer means, the length of said elongated body being predetermined so that resonant torsional elastic waves are produced therein by said pulses and the intervals between successive pulses being predetermined to allow the resonant waves to substantially completely decay therein, a filter supplied from said transducer means tuned to the fundamental frequency of said resonant waves and discriminating substantially against the second harmonic thereof, and an electric measuring circuit supplied from said filter and responsive to variations in the rate of decay of the electrical waves corresponding to the decaying resonant waves in said elongated body.

46. Apparatus for determining physical properties, including a function of viscosity, of fluid-like materials, particularly of liquid materials and thin films, which comprises an elongated body of solid material at least a portion of which is adapted to be contacted by said fluid-like material, transducer means associated with said elongated body for exciting elastic waves propagating longitudinally in said elongated body with a component of oscillation in shear with a contacting fluid-like material and for converting elastic waves in said body into electrical waves, a source of electrical pulses for periodically energizing said transducer means, the length of said elongated body being predetermined so that resonant elastic wave oscillations are produced therein by said pulses and the pulse repetition rate being selected to allow said resonant elastic waves to substantially completely decay in the intervals between pulses, and an electrical measuring circuit connected to said transducer means for measuring variations in the rate of decay of said resonant waves in said elongated body and variations in the frequency thereof.

References Cited in the file of this patent

UNITED STATES PATENTS

| 2,142,854 | La Pierre | Jan. 3, 1939 |
| 2,340,992 | Siegel | Feb. 8, 1944 |
| 2,550,052 | Fay | Apr. 24, 1951 |
| 2,573,284 | Shaw | Oct. 30, 1951 |
| 2,577,235 | Davidson | Dec. 4, 1951 |
| 2,607,746 | Merten et al. | Aug. 19, 1952 |
| 2,633,016 | Millington | Mar. 31, 1953 |
| 2,635,746 | Gordon | Apr. 21, 1953 |

FOREIGN PATENTS

| 638,285 | Great Britain | June 7, 1950 |

UNITED STATES PATENT OFFICE
CERTIFICATE OF CORRECTION

Patent No. 2,839,915                                                        June 24, 1958

Wilfred Roth et al.

It is hereby certified that error appears in the printed specification of the above numbered patent requiring correction and that the said Letters Patent should read as corrected below.

Column 5, line 49, for "arcuate" read -- accurate --; column 11, lines 23 and 25, for "receiver", each occurrence, read -- receive --; line 39, for "areas" read -- area --; column 13, line 61, before "viscosity" insert -- high --; column 16, line 2, for "effect" read -- affect --; column 17, line 32, for "element" read -- elements --; column 26, line 67, for "voscosity" read -- viscosity --; column 28, line 59, list of references cited, under "UNITED STATES PATENTS", for "2,607,746 Merten et al -------- Aug. 19, 1952" read -- 2,607,217 Merten et al ----Aug. 19, 1952 --.

Signed and sealed this 16th day of September 1958.

(SEAL)
Attest:

KARL H. AXLINE                                                      ROBERT C. WATSON Attesting Officer                                                Commissioner of Patents